United States Patent [19]

Liu

[11] Patent Number: 4,853,162
[45] Date of Patent: Aug. 1, 1989

[54] CENTRIFUGAL COOLING DEVICE

[76] Inventor: Wen H. Liu, No. 139, Chunghwa Road,, Miaulih, Taiwan

[21] Appl. No.: 197,656

[22] Filed: May 23, 1988

[51] Int. Cl.⁴ .............................................. B01F 3/04
[52] U.S. Cl. ......................................... 261/89; 55/230
[58] Field of Search ....................... 261/24, 89; 55/230

[56] References Cited

U.S. PATENT DOCUMENTS

| | | | |
|---|---|---|---|
| 2,053,387 | 9/1936 | Williams | 261/89 |
| 2,252,982 | 8/1941 | Roberts | 55/230 |
| 2,793,710 | 5/1957 | Robinson | 261/89 |
| 3,253,819 | 5/1966 | Talbot | 261/89 |
| 3,328,009 | 6/1967 | Panzica et al. | 261/89 |
| 3,479,799 | 11/1969 | Aoki | 55/230 |
| 3,480,263 | 11/1969 | Davidson | 55/230 |
| 3,853,515 | 12/1974 | Davis | 55/230 |
| 4,212,654 | 7/1980 | Caraway | 261/89 |
| 4,294,781 | 10/1981 | Holmquist | 261/89 |
| 4,687,603 | 8/1987 | Liu | 261/24 |

FOREIGN PATENT DOCUMENTS 154309 11/1920 United Kingdom .................. 261/89
699338 11/1953 United Kingdom .................. 55/230

Primary Examiner—Tim Miles
Attorney, Agent, or Firm—Bernard R. Gans

[57] ABSTRACT

Improvements in a centrifugal cooling tower which include a housing having a water tank, a water valve, an over-flow pipe and an outlet at its lower portion. The housing has louvers on its perimeter and upper portion with louvers defining a number of long slits for air to be readily drawn in. A screen structure near the upper inside of the housing collects the upwardly rising water vapor to form condensated which falls down into the tank to be used for re-circulated. Fixed beams and a motor are mounted on a fixed post in the inside center of the body frame. Supports are fixed to the post respectively by a deflection screen member and a perforated drum of the rotating cylinder supported in position by a shaft. The perforated drum has a spiral blade fan for drawing in a large amount of outside air to perform heat exchange with droplets of water.

4 Claims, 2 Drawing Sheets

CENTRIFUGAL COOLING DEVICE

BACKGROUND AND SUMMARY OF THE INVENTION

This invention relates to a cooling device, especially to a centrifugal cooling tower designed for increased cooling efficiency, decreased loss of circulating water and a reduced tower size.

Generally, according to principles of cooling, cooling towers are used to absorb heat from water and to expose as much water surface area as possible to thereby accomplish the purpose of cooling. In conventional cooling towers, the heated water is permitted to flow out of the pipe inside the tower housing and there it drops through the cooled corrugated plates. Air is sucked in through an inlet and next passed out from the outlet at the top by the action of a motor-driven fan. After cooling the circulating air (absorbing heat from the air), heated water falls into a water tank below and in the process heat is released through tthe outlet at the top so that the water is cooled to a certain extent. During the process, although there is an exchange of heat, because the time of contact between the heated water and the air is rather short, the temperature of water still remains high and the cooling efficiency is very much limited. In use, therefore, the process is not as practical as it might be. This drawback is even more outstanding in the case of large-sized cooling systems.

It is therefore a purpose of the invention to make innovations upon the conventional cooling tower designs. In a large-sized cooling tower such as the one disclosed in U.S. Pat. No. 4,687,603, a fixed rotatable motor has to be supported on a plurality of beam structures. Because the tower has a large breadth and the supporting beams must exceed in length, it has made the supporting location less stable. Next, a deflection screen is provided on the outer circumference of the perforated cylinder where low and high temperature water on passing into the cylinder is slung out to hit against the net and forms into fine droplets. A fan is used to draw in the outside air through the louver slats provided for exchanging heat with water droplets in the compartment inside the tower. Cooling is accomplished when finally the high temperature air passes out through the opening at the top of the tower, whereas the low temperature water drops into a collecting tank. However, in use, the conventional cooling tower presents a number of design drawbacks, particularly, owing to a limitation in the arrangement of the lower and also the narrow opening at the top, the amount of circulating air is limited. Furthermore, when the heated water droplets (which are carried along by the high temperature air resulting from the heat exchange) pass out from the opening at the top, then there is a considerable loss of water from the circulation for cooling. It was therefore be necessary for water to be added in frequently through a ball float type water valve.

In view of the above-mentioned disadvantages, according to the invention an improved centrifugal cooling system has been devised which is capable of increasing the cooling efficiency, minimizing loss of circulating water and reducing the overall size of water towers.

Accordingly, the main object of the invention is to provide a large-sized cooling tower having the body frame thereof defined by a plurality of long slits. There is disposed near the upper end of the tower a bar screen structure for collection of water.

Fixed beams and a motor are mounted by a fixed post in the center portion of the housing. The fixed supports are attached respectively by a deflection screen member and a perforated drum of the double-function rotating cylinder supported in position by a shaft. A perforated drum is provided near to the upper portion with a spiral blade fan firmly fixed in position and the upper edge formed by the upper portion of this perforated drum is capable of engaging with a ring portion of the housing. In accordance with the arrangement of the invention, a large amount of outside air can be drawn in to promote better heat exchange with fine droplets of water. Additionally, the upwardly floating water vapor, on coming into contact with the bar screen structure, condenses to form drops of water, which fall down into a storage tank to be recirculated.

BRIEF DESCRIPTION OF THE DRAWINGS

Other aspects and advantages of the present invention will become apparent from the following description of the preferred embodiment, taken in conjunction with the accompanying drawings, wherein.

DETAILED DESCRIPTION OF THE PREFERRED EMBODIMENT

Figure 1:
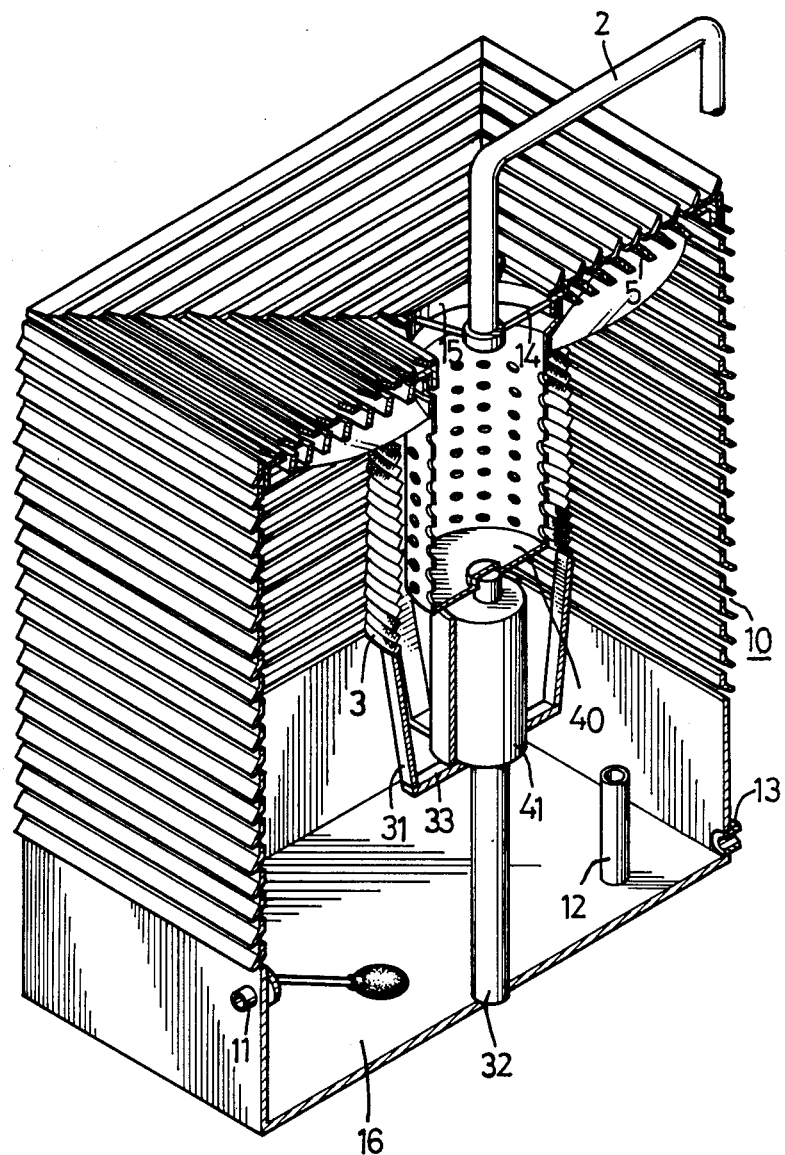
FIG. 1 is a perspective view of a cooling tower constructed in accordance with the principles of the present invention.
Figure 2:
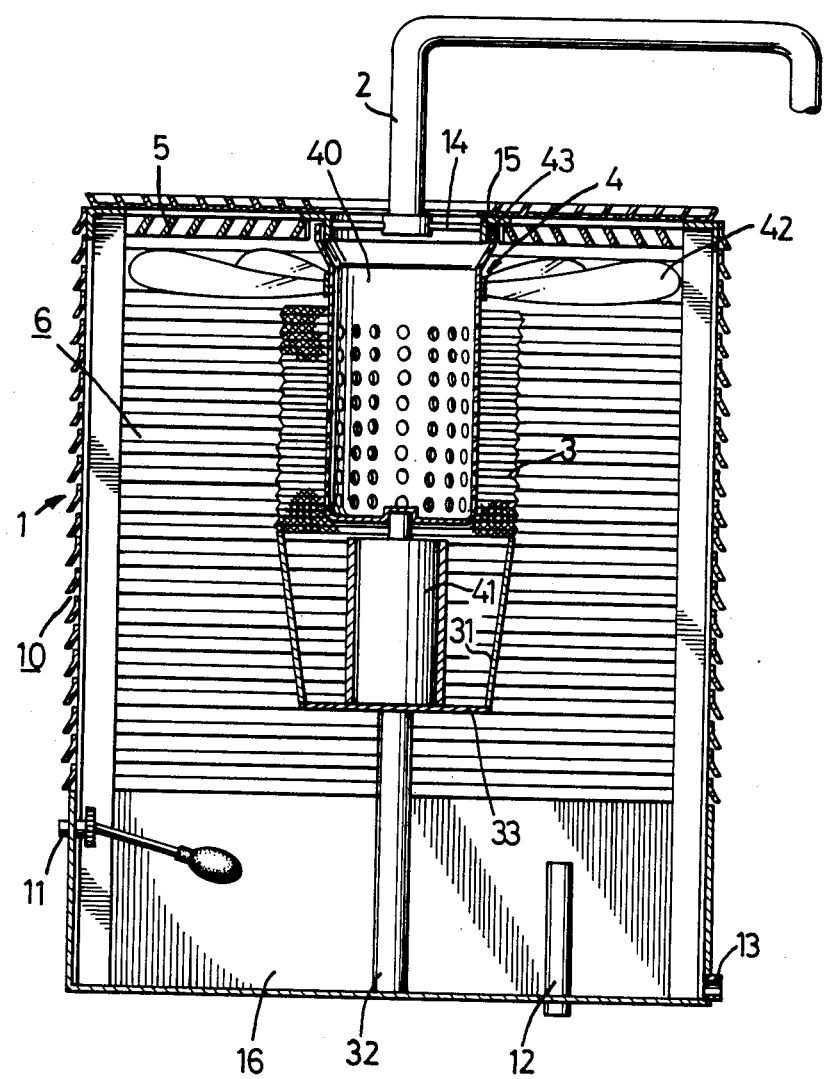
FIG. 2 is a plan view of the cooling tower.

FIGS. 1 and 2 show a large-size centrifugal cooling tower according to the preferred embodiment of the invention. The tower comprises a housing 1 including therein a deflection screen member 3, a perforated drum 40 of a double function rotating cylinder 4 driven by a motor 41 whereby water coming from an inlet tube 2 is permitted to flow into the perforated drum 40.

On the perimeter and the upper side of the housing 1, a plurality of long slits 10 are formed to facilitate the circulation of air. The long slits 10 are defined by louvers fitted in position by supports. The louvers may be either fixed or adjustable. A water storage tank 16 is formed at the bottom of the housing 1 where there is also located a floating water supply valve 11 as needed in a general cooling tower, an overflow pipe 12 and a water outlet 13. The upper central portion of the housing 1 is folded downwardly to form a riong portion 15. A water inlet 2 is secured in position on support 14, which is within the ring portion 15.

Next, a post is fixed in the center of the water storage tank 16 of the housing 1. On top of the post 32 fixed beams 33 are secured. A screen member 3 is supported on a plurality of fixed stands 31 located at the periphery of the fixed beams 33, in the center of which is a motor 41 having a double-function rotating cylinder 4 secured in position on the shaft thereof. The rotating cylinder 4 has a perforated drum 40 and is appropriately located within the cylindrical screen member 3 formed from triangular section bar. A blade is fixed near the upper end of the perforated drum 40 with the edge portion 43 formed by the upper end of the perforated drum 40 being adapted to fit in the ring portion 15 so as to stabilize rotation. Furthermore, a screen structure 5 is disposed above the fan 42 and close to the inner side of the upper end of the housing 1 for collection of water vapor.

Hereinbelow, a description of the operation of the cooling tower of the present invention is given.

In use, heated water flowing in from the inlet tube 2 is guided into the perforated drum 40 of the rotating cylinder 4. The rotating perforated drum 40 (driven by the motor 41) next sends the water out in jets through the apertures in the drumn. When the water contacts the screen member 3 it changes into fine water droplets and water vapor. The blade fan 42 which is now revolving together with the perforated drum 40 draws in low temperature air from the outside through the long slits 10 in the louvers of the housing 1 and releases it into the heat exchange compartment 6, as indicated by the arrow in FIG. 2, thereby resulting in an exchange of heat between the low temperature air and the droplets and water vapor. The water, when cooled, drops into the storage tank 16 and the water vapor that is floating about in the heat exchange compartment 6 condenses to form large-size drops when it comes into contact with the screen structure 5 and falls into the storage tank 16 so as to minimize losses of water.

The preferred embodiment of the invention has a number of unique features which may be enumerated as below:

1. The perimeter of the housing 1 is provided with a plurality of long slits 10 between the louvers. This design allows the outside air to be drawn in more readily, thus making it possible to raise the efficiency of the heat exchange process and to obtain a most desired cooling effect.

2. Again, the perforated drum 4 is so designed that the edge portion 43 of the upper end thereof is located in the circumference of the ring portion 15 in the upper end of the housing 1 permitting the perforated drum 4 to be more stable during rotation.

3. The perforated drum 4 is provided near the upper portion thereof with a spiral blade fan 42. This arrangement increases the amount of air which is drawn in from the surroundings thereby raising the cooling efficiency.

4. The arrangement of the motor on a fixed post inside the housing makes it possible for the entire housing to occupy less space and the machine to be more stable during working.

5. The provision of a screen structure for collection of the water makes it possible for the vapor to be collected and formed into drops of water, which then fall into the storage tank, thus minimizing loss of the water.

While the invention has been particularly shown and described with reference to a preferred embodiment thereof, it will be understood that changes in form and details may be made therein without departing from the spirit and scope of the invention.

I claim:

1. An improved centrifugal cooling device, comprising a housing, said housing including a water tank at the lower portion thereof, a valve for supply of water, an overflow pipe and an outlet:

a plurality of louvers and long slits on a perimeter and an upper portion of said housing, a screen structure set near an upper inner side thereof for collecting of water vapor, a ring portion formed in an upper center portion thereof and fixed beams and a double-function rotating cylinder secured by a fixed post to an inside central portion thereof, means to supply water to the interior of said cylinder, said fixed beams and rotating cylinder having a respective deflection screen member and a motor-driven perforated drum at upper ends thereof, said perforated drum being locatable in said ring portion by an edge portion formed by the upper end thereof for maintaining stability during rotation and provided near the upper portion thereof with a spiral blade fan located beneath said screen structure.

2. The centrifugal cooling device according to claim 1, wherein said motor is secured in position on the upper end of said fixed post and inside said housing.

3. A centrifugal cooling device according to claim 1, wherein said louvers are fixable.

4. A centrifugal cooling device according to claim 1, wherein said louvers are angularly adjustable.

* * * * *